United States Patent
Puri et al.

(10) Patent No.: US 7,706,289 B2
(45) Date of Patent: Apr. 27, 2010

(54) SYSTEM AND METHOD FOR VALIDATING PACKET CLASSIFICATION

(75) Inventors: Rahoul Puri, Los Altos, CA (US);
Arvind Srinivasan, San Jose, CA (US);
Saranga P. Pogula, Milpitas, CA (US)

(73) Assignee: Oracle America, Inc., Redwood Shores, CA (US)

(*) Notice: Subject to any disclaimer, the term of this patent is extended or adjusted under 35 U.S.C. 154(b) by 215 days.

(21) Appl. No.: 11/967,225

(22) Filed: Dec. 30, 2007

(65) Prior Publication Data

US 2009/0168657 A1 Jul. 2, 2009

(51) Int. Cl.
*G06F 9/445* (2006.01)
(52) U.S. Cl. ............................ 370/241; 707/203
(58) Field of Classification Search ............ 370/241, 370/248, 252; 717/168, 170, 171; 707/203; 709/230
See application file for complete search history.

(56) References Cited

U.S. PATENT DOCUMENTS

| 6,256,773 | B1* | 7/2001 | Bowman-Amuah | 717/121 |
| 6,349,405 | B1* | 2/2002 | Welfeld | 717/170 |
| 6,587,466 | B1* | 7/2003 | Bhattacharya et al. | 370/395.21 |
| 7,032,022 | B1* | 4/2006 | Shanumgam et al. | 709/225 |
| 7,414,970 | B2* | 8/2008 | Towle | 370/230 |
| 7,587,749 | B2* | 9/2009 | Leser et al. | 726/1 |
| 2005/0044252 | A1* | 2/2005 | Floyd et al. | 709/230 |
| 2005/0138204 | A1* | 6/2005 | Iyer et al. | 709/242 |
| 2006/0048142 | A1* | 3/2006 | Roese et al. | 717/176 |

\* cited by examiner

*Primary Examiner*—Min Jung
(74) *Attorney, Agent, or Firm*—Park, Vaughan & Fleming LLP (57) ABSTRACT

A system and method for validating packet classification within an input/output device or component. Based on a target DMA engine within the device, and a protocol path for testing the DMA engine, sets of packet attributes are generated and used to format packets for input to the device. The output of the device is examined to determine if the correct DMA engine was used within the device. The DMA policy specifying which DMA engine to use for a particular packet configuration or set of protocol attributes can be dynamically replaced or modified without halting the validation process.

19 Claims, 5 Drawing Sheets

Packet Classification Validation Framework 102

SYSTEM AND METHOD FOR VALIDATING PACKET CLASSIFICATION

RELATED APPLICATIONS

This application is related to U.S. patent application Ser. No. 11/418,901, filed May 4, 2006 and entitled "Abstracted Host Bus Interface for Complex High Performance ASICs," U.S. patent application Ser. No. 11/974,414, filed Oct. 12, 2007 and entitled "System and Method for Verifying the Receive Path of an Input/Output Component," and U.S. patent application Ser. No. 11/974,413, filed Oct. 12, 2007 and entitled "System and Method for Verifying the Transmit Path of an Input/Output Component," all of which are incorporated herein by reference.

BACKGROUND

This invention relates to the field of computer systems. More particularly, a system and method are provided for verifying end-to-end packet classification by an input/output component.

Before releasing a communication device or component, such as a network interface circuit, communication bus, disk controller, and so on, it is essential to verify its proper operation. Traditionally, to test the operation of a communication device a static set of predetermined inputs or stimuli would be applied to the component in a strict order to determine if its output matched what was expected. Hooks might be placed in the device being tested to obtain direct feedback regarding its operation.

To test an input/output component's classification of packets, a static set of packet inputs would be assembled and fed to the component. However, this set of input is generally only useful while the component applies one particular DMA (Direct Memory Access) policy, which specifies which DMA engine should be invoked to process a packet, based on the packet's composition.

When a different policy is to be tested, a different set of input packets must be assembled and applied. To fully test the component with various policies, a very large number of packets (e.g., thousands) may be needed, which will have to be pre-generated before the tests can commence. In addition, a substantial amount of storage may be needed to store the packets, and testing must be halted while one policy is exchanged for another.

This testing environment does not reflect an actual operating environment of the input/output device. In live operation, it may receive packets that have a far wider range of attributes than the predetermined static stimuli applied during verification. And further, it may be desirable to dynamically modify or replace its operating policy (e.g., DMA policy). Even if the device is capable of dynamic policy modification, if it has not been tested in this mode there is a substantial risk that the component will not function correctly. Thus, traditional verification environments and methods often fail to adequately test input/output components and do not allow for dynamic alteration of an operating policy without halting the testing.

SUMMARY

In one embodiment of the invention, a system and method are provided for validating packet classification within an input/output device or component. Based on a target DMA engine within the device, and a protocol path for testing the DMA engine, sets of packet attributes are generated and used to format packets for input to the device. The output of the device is examined to determine if the correct DMA engine was used within the device. The DMA policy specifying which DMA engine to use for a particular packet configuration or set of protocol attributes can be dynamically replaced or modified without halting the validation process.

No hooks are made into the device being tested; so instead, callbacks are employed to verify implementation of an updated or replacement policy within the device. When a replacement policy is installed, a period of uncertainty exists during which a particular packet may be classified according to the old policy or the replacement policy, meaning that any of multiple DMA engines may be used to process the packet within the device. The packet classification validation framework allows for this and detects when the device stops using the old policy and starts using the replacement policy.

DETAILED DESCRIPTION

The following description is presented to enable any person skilled in the art to make and use the invention, and is provided in the context of particular applications of the invention and their requirements. Various modifications to the disclosed embodiments will be readily apparent to those skilled in the art and the general principles defined herein may be applied to other embodiments and applications without departing from the scope of the present invention. Thus, the present invention is not intended to be limited to the embodiments shown, but is to be accorded the widest scope consistent with the principles and features disclosed herein.

In one embodiment of the invention, a system and method are provided for validating the packet classification performed by an input/output component or device. In this embodiment, the operating policy of the DUT (Device under Test), which specifies which DMA engine should be invoked when a particular type or classification of packet is encountered, can be modified or replaced dynamically without halting operation of the device.

Packet stimuli to be fed to the DUT are generated dynamically, thus eliminating any need to pre-configure and store a vast number of static test packets. The operative policy is shadowed in one or more packet configurators, so that when the policy is amended or replaced, the packet configurator can quickly begin generating packet attributes consistent with the new or amended policy.

Implementations of this embodiment of the invention may be used to test the receive and/or transmit paths of various types of input/output components, such as network interface circuits, routers, disk controllers, etc.

Figure 1:
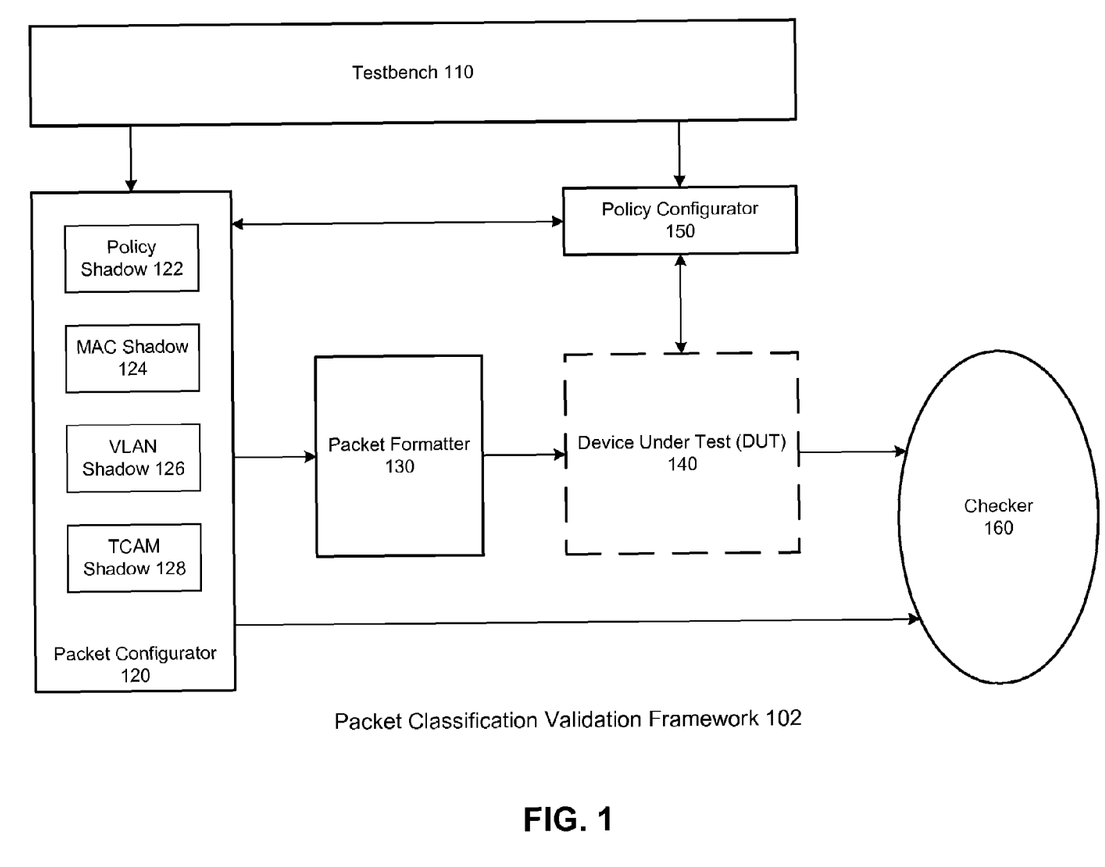
FIG. 1 is a block diagram depicting a packet classification validation framework according to an embodiment of the present invention.

FIG. 1 is a block diagram of a packet classification validation framework according to one embodiment of the invention. In this embodiment, framework 102 includes testbench 110, packet configurator 120, packet formatter 130, DUT 140, policy configurator 150 and checker 160.

The testbench, or test, specifies which DMA engine or engines of the DUT and which classification path or paths should be the focus of a particular testing evolution or series of tests. Testbench 110 therefore identifies a set of DMA engines and protocol paths, fields and/or other packet attributes (e.g., just layer 2 and layer 3 protocol headers, layer 2 through layer 4 protocol headers, selected fields of multiple layers) to packet configurator 120. The packet configurator will use that input to generate sets of packet characteristics for testing the device as requested by the test.

The testbench also selects and/or configures a DMA policy to be applied within the DUT, which policy will be mimicked or shadowed in the packet configurator. Testbench 110 identifies or sends the policy to be applied to policy configurator 150, which will coordinate its implementation. In an alternative embodiment of the invention, the testbench may send the policy only to the packet configurator, which will then ensure the policy is programmed into the DUT.

Packet configurator 120 uses the operative DMA policy (maintained in policy shadow 122) to determine what sets or permutations of packet attributes will exercise the target DMA(s). In particular, for the target DMA(s) and path(s)/field(s) identified by testbench 110, packet configurator 120 configures any number of sets of packet attributes within the path(s), to reach the target DMA(s).

Each set of attributes is passed to packet formatter 130. In addition, in the illustrated embodiment of the invention, for each set of packet attributes that is forwarded to packet formatter 130 for submission to DUT 140, the packet configurator issues a token to checker 160 that identifies the packet (e.g., a unique identifier) and the target DMA engine(s) that the DUT might use to process the packet.

Because a path specified by the testbench may include any layers of the protocol stack—through layer 7—packet configurator 120 maintains a number of shadows to help it determine what permutations of packet protocol attributes are suitable for a given test sequence.

In one implementation of this embodiment of the invention, different shadows are maintained for different layers or subsets of protocol attributes. In this implementation, MAC shadow 124 maintains a MAC address table that mirrors the MAC address table with which the DUT has been programmed. VLAN shadow 126 mimics the programmed VLAN table, and TCAM shadow 128 maintains the TCAM and associated data programmed into the DUT (e.g., source IP address source port, destination IP address, destination port, layer 4 protocol), which may be masked. Any or all of these attributes (MAC destination address, VLAN, TCAM) can be enabled or disabled for a given test or test packet.

In this implementation of the illustrated embodiment of the invention, the shadows are updated when the DUT is programmed or re-programmed. In particular, when a policy is replaced or modified in the DUT by policy configurator 150, the policy configurator sets corresponding callbacks in the packet configurator (e.g., one for each shadow that needs to be updated), and provides it with the same programming being submitted to the DUT.

Each shadow in packet configurator 120 may store multiple values or, alternatively, there may be multiple shadows of a particular type (e.g., MAC, VLAN, TCAM). One value reflects the current programming of the DUT while the other value comprises new programming that is or will be installed in the DUT. When a shadow's callback from the policy configurator succeeds (e.g., the policy configurator notifies the shadow or packet configurator that the DUT has been programmed or re-programmed), the packet configurator may then begin using the new value in place of the previous one.

In other implementations, other protocol attributes may be considered when generating attributes for a test packet. For example, packet attributes could be generated for a promiscuous mode test, in which case virtually any attributes could be assembled to test the DUT's classification during promiscuous mode. The validation framework may shadow a hash of attributes, such as various fields (e.g., TCP, UDP, SCTP, AH, ESP) for IPv4 and/or IPv6 packets. Yet further, higher level protocol attributes (e.g., above layer 4) may be used by a packet configurator and so additional shadows or some other configuration of shadows (e.g., a single unified shadow) may be maintained.

Packet configurator 120 is also capable of purposefully injecting an error into a packet. Thus, in addition to the use of various protocol attributes, and values for those attributes, another option is to generate a flawed set of packet attributes with an invalid value or structure. Global packet attributes that encompass more than one protocol or protocol attribute may also be employed by the packet generator, such as checksum and CRC (Cyclic Redundancy Check), with or without intentional errors injected.

Packet formatter 130 receives each packet's set of attributes from packet configurator 120 and forwards them to DUT 140. The attributes may be employed to form a true packet if, for example, the test is intended to test the DUT's receipt of packets from a network or other external source. Or, to test the DUT's transmit path, the attributes may be submitted to the DUT as they would be provided by a host computer or application.

DUT 140 receives the packet attributes or packets from packet formatter as if the device were operating in a real-world environment. It performs its classification in accordance with the operative DMA policy and outputs the packet contents or packet to checker 160 similar to the manner in which it would forward the contents to a destination host or an outgoing packet to an external entity (e.g., a network).

Checker 160 compares the classification performed by DUT 140 for a given packet with the associated information received from packet configurator 120. If the DMA engine used by the DUT to process the packet does not match what was expected by the packet configurator, the test may fail, or a number of errors may accumulate before failure. The checker may also examine other aspects of the DUT's performance, such as where it stored its output, the content or configuration of the output, etc.

Policy configurator 150, in the illustrated embodiment of the invention, is responsible for coordinating implementation of an initial or replacement DMA policy within DUT 140 and packet configurator 120. When test 110 promulgates a new policy, the policy configurator provides that policy to both components. In alternative embodiments of the invention, functions of policy configurator 150 may be performed by testbench 110, or packet configurator 120 may be responsible for passing a new policy to DUT 140.

Figure 2:
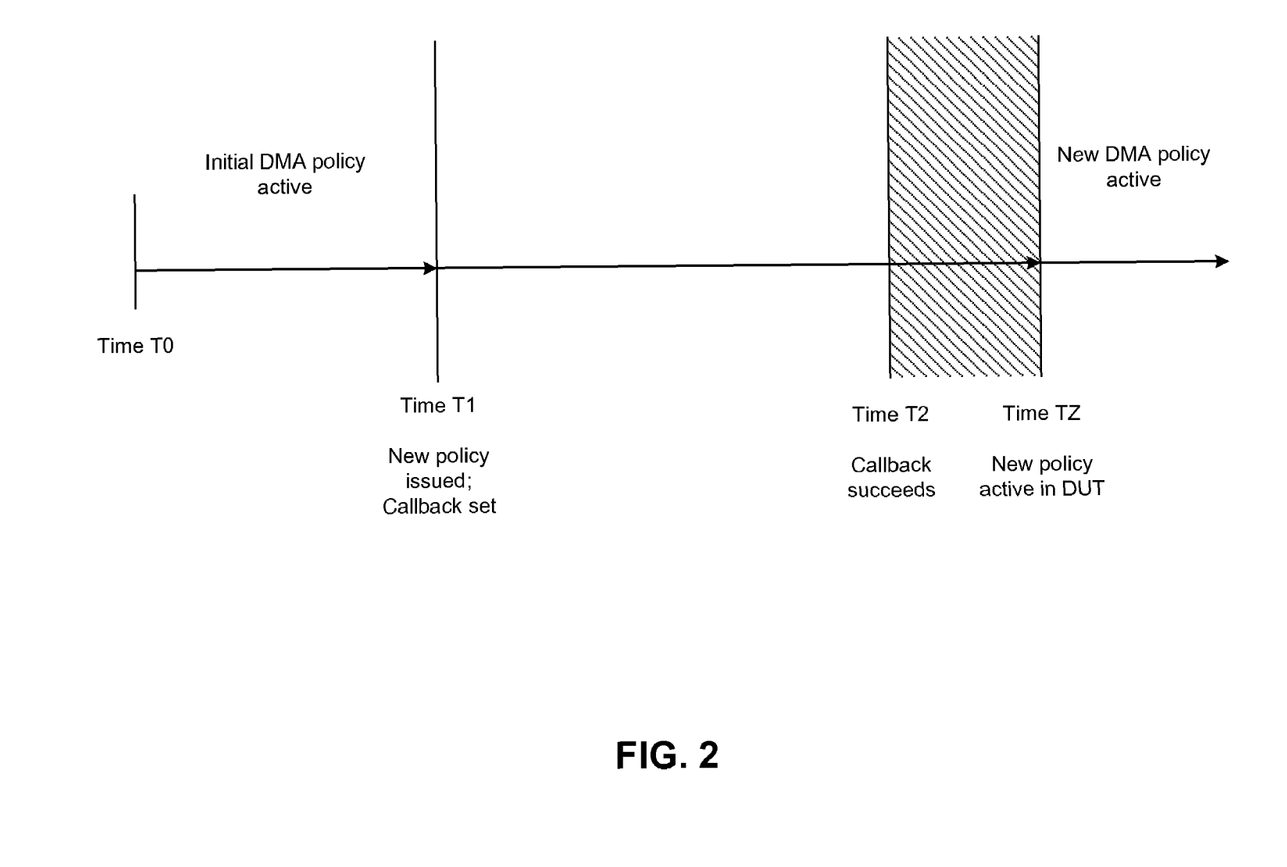
FIG. 2 demonstrates the use of a callback to reduce the period of uncertainty, according to an embodiment of the invention, when replacing one DMA policy with another.

As shown in FIG. 2, because no hooks are set into the DUT hardware in this embodiment of the invention, there is a period of uncertainty as to when a new policy is actually fully active in the DUT. FIG. 2 represents the initiation of testing with an initial DMA policy at time T0. At time T1, a new DMA policy is issued and made available to the DUT. Because there is no direct feedback from the hardware as to when the new policy is fully engaged for all packets (at time TZ), there is a period of uncertainty after time T1 during which the packet classification validation framework cannot be certain which policy will be used for a given packet.

As one consequence, during this period of uncertainty the packet configurator may identify multiple DMA engines to the checker for a particular packet, including the DMA that the DUT should use under the original policy and the DMA that the DUT should use under the new policy. If the DUT uses some other DMA engine for classification the checker will know some error occurred.

To reduce the period of uncertainty to a very short period, the packet classification validation framework employs callbacks to notify the packet configurator when the new policy has been implemented. As described above, for example, the policy configurator may set callbacks into the packet configurator (and/or individual shadows) when it is going to program or re-program the DUT, and provide the packet configurator/shadows with the same programming. When the policy configurator completes its programming or re-programming of the DUT, it may then issue a success message to the packet configurator/shadows, at which point they can switch over to operate with the same programming.

In FIG. 2, time T2 represents when the callback associated with the new policy succeeds. Between time T2 and time TZ, the packet configurator knows only a DMA engine specified in either the original or new policy should be used to classify a packet, and it also knows that once the DUT classifies a packet according to a DMA dictated by the new policy, it should no longer classify any packets according to a DMA dictated by the original policy, assuming that the DMA operates on a FIFO basis.

The use of a callback to verify implementation of a new policy shows that the period of uncertainty can be dramatically reduced even without hooking into the hardware being tested.

Figure 3A:
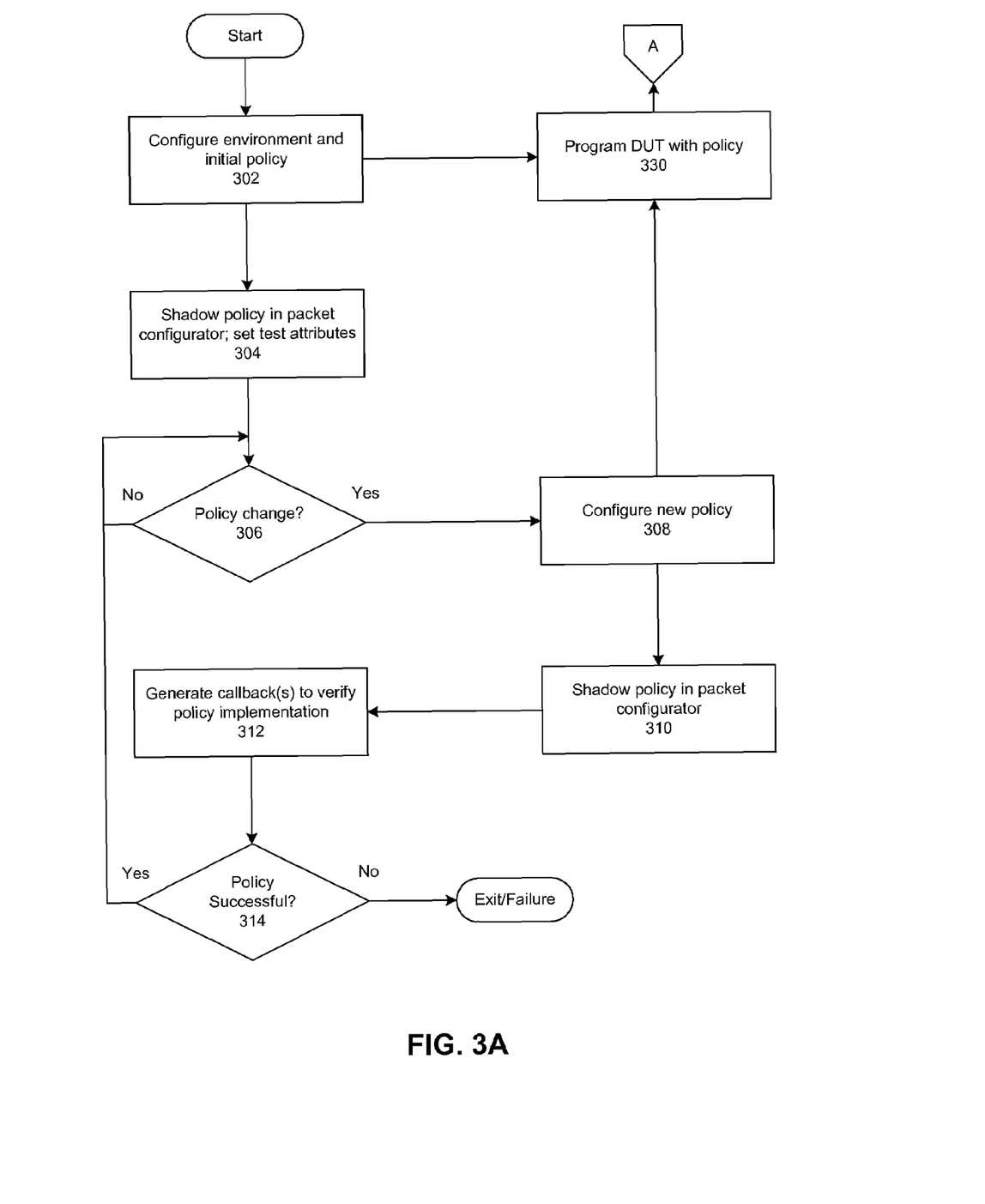
FIGS. 3A-B comprise a flowchart illustrating a method of validating packet classification in a device under test, according to an embodiment of the invention.
Figure 3B:
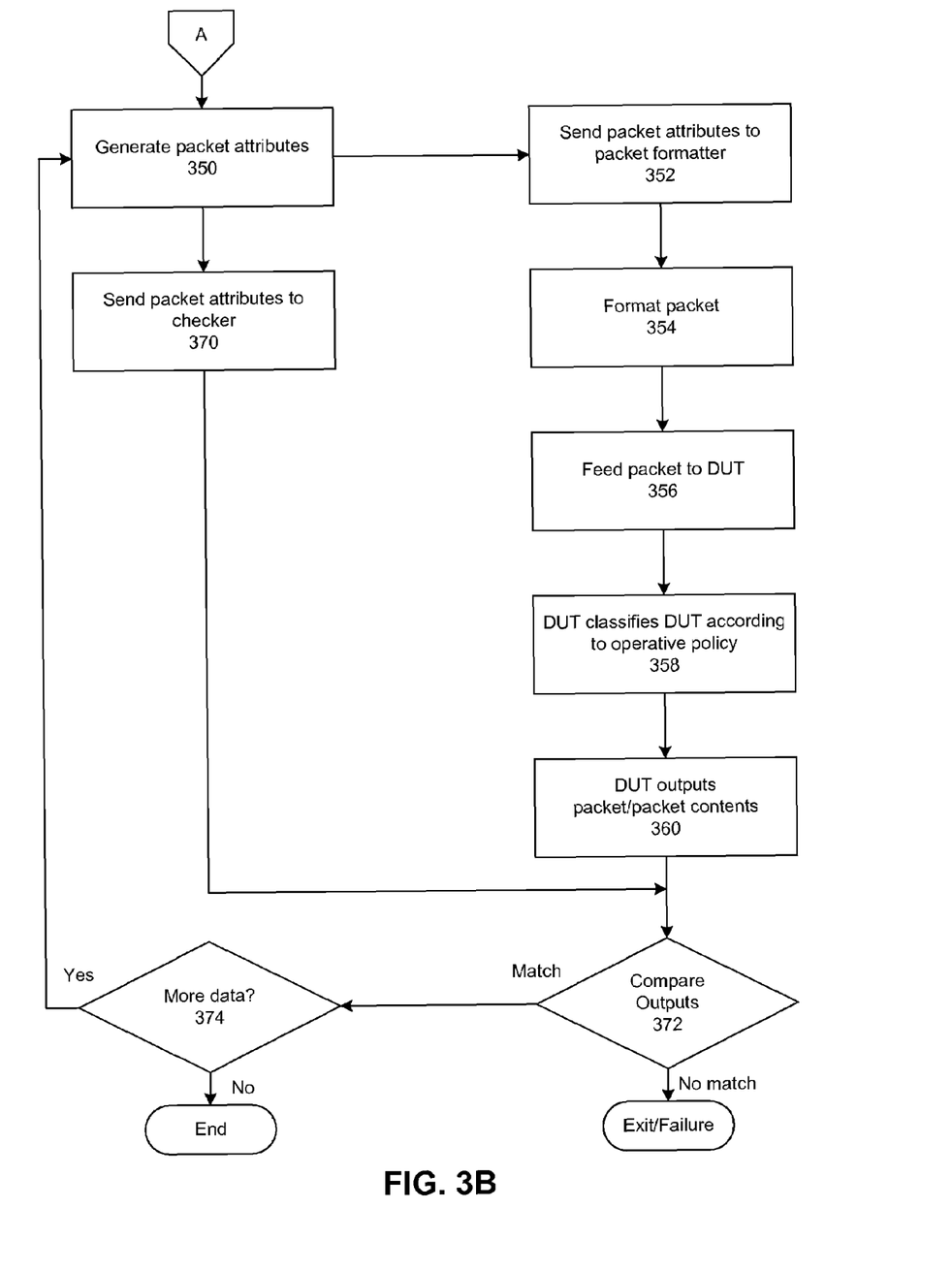

FIGS. 3A-B comprise a flowchart demonstrating a method of validating packet classification according to one embodiment of the invention.

In operation 302, the validation environment and an initial DMA policy are configured. After operation 302 the method advances to operations 304 and 330. This divergence reflects the parallel nature of two concurrent processes within the illustrated method. In particular, as shown in FIG. 3B and described below, packet classification validation can continue unabated until a failure occurs or all desired testing is complete. Simultaneously, however (and as shown in FIG. 3A), the DMA policy applied in the DUT (and shadowed in the packet configurator) may be updated or replaced. Testing need not cease while a new policy is installed.

In operation 304, the initial policy is applied in the packet configurator and initial test attributes are set. For example, one or more DMA engines in the DUT may be identified as targets for testing, along with a particular protocol path and/or particular protocol attributes to use to test the target DMA engine(s).

In operation 306, the framework awaits a policy change, at which time the method continues with operation 308.

In operation 308, a new policy is configured or may be selected from a set of preconfigured policies. After operation 308 the method advances to operations 310 and 330.

In operation 310, as in operation 304, the new policy is shadowed in the packet configurator. In particular, the proposed new policy parameters (e.g., new MAC address table, replacement TCAM data) are stored in or with the packet configurator's shadows, but the current, operative parameters are not yet replaced.

In operation 312, one or more callbacks are set to help determine when the new policy has been programmed into or implemented within the DUT. In one implementation, a callback involves monitoring a process for installing or programming the policy into the DUT.

In operation 314, the framework determines whether the callbacks are successful, which indicates that the DUT should begin classifying packets according to the new policy. For example, if the policy configurator is able to program or re-program the DUT without error, the callback(s) succeed.

If the callback does not succeed within some period of time, the validation process may fail, may revert to the previous policy or may try again to implement the new policy.

If the policy succeeds, the packet configurator shadows switch over to the new/replacement policy parameters, new test attributes may be implemented (e.g., if provided by the testbench), and the method returns to operation 306 to await another policy change.

In operation 330, the DUT is programmed with the initial DMA policy or an updated or replacement policy, depending on whether operation 330 is reached from operation 302 or operation 308. Any failure in the policy programming process with the DUT may cause verification to be halted, or the programming may be retried. The method then advances to operation 350.

In operation 350, the packet classification validation framework (e.g., the packet configurator) begins generating attributes of packets for testing the target DMA engine(s), according to the specified parameters (e.g., protocol path or attributes). The method then diverges to operations 352 and 370.

In operation 352, the generated attributes are provided to the packet formatter.

In operation 354, the packet formatter uses the attributes to format a packet or pseudo-packet. In one implementation of this embodiment of the invention, if the receive path of the DUT is being tested the formatter may generate an actual packet to mimic its receipt from a network or other communication link. If the transmit path of the DUT is being tested, the packet formatter may package the attributes into a form in which the DUT would receive them from a host application or computer.

In operation 356, the packet or pseudo-packet is submitted to the DUT for processing.

In operation 358, the DUT classifies the packet or pseudo-packet according to the operative DMA policy and invokes one or more DMA engines to process it.

In operation 360, the DUT outputs the packet or packet contents through a DMA engine, to a checker acting as a host (for the receive path) or a communication link (for the transmit path).

In operation 370, the packet configurator also provides the generated attributes to the checker, and identifies which DMA engine(s) within the DUT may or should output the corresponding packet. In addition, the configurator identifies which packet the attributes apply to, so that the checker can match the attributes with the correct output from the DUT.

As described previously, the packet configurator may identify more than one DMA engine, especially if the framework is in the process of switching over from one DMA policy to another, in which case a particular packet may be processed in the DUT according to either policy during the policy transition.

In operation 372, the checker compares the output of the DUT with what the packet configurator indicated the output should be—for example, which DMA handled the output, how the output should be configured. If they match, the method advances to operation 374. Otherwise, the method may fail or accumulate some number of errors before failing.

In operation 374, if more data (i.e., more packets) are to be fed to the DUT, the method returns to operation 350. Otherwise the method ends.

Figure 4:
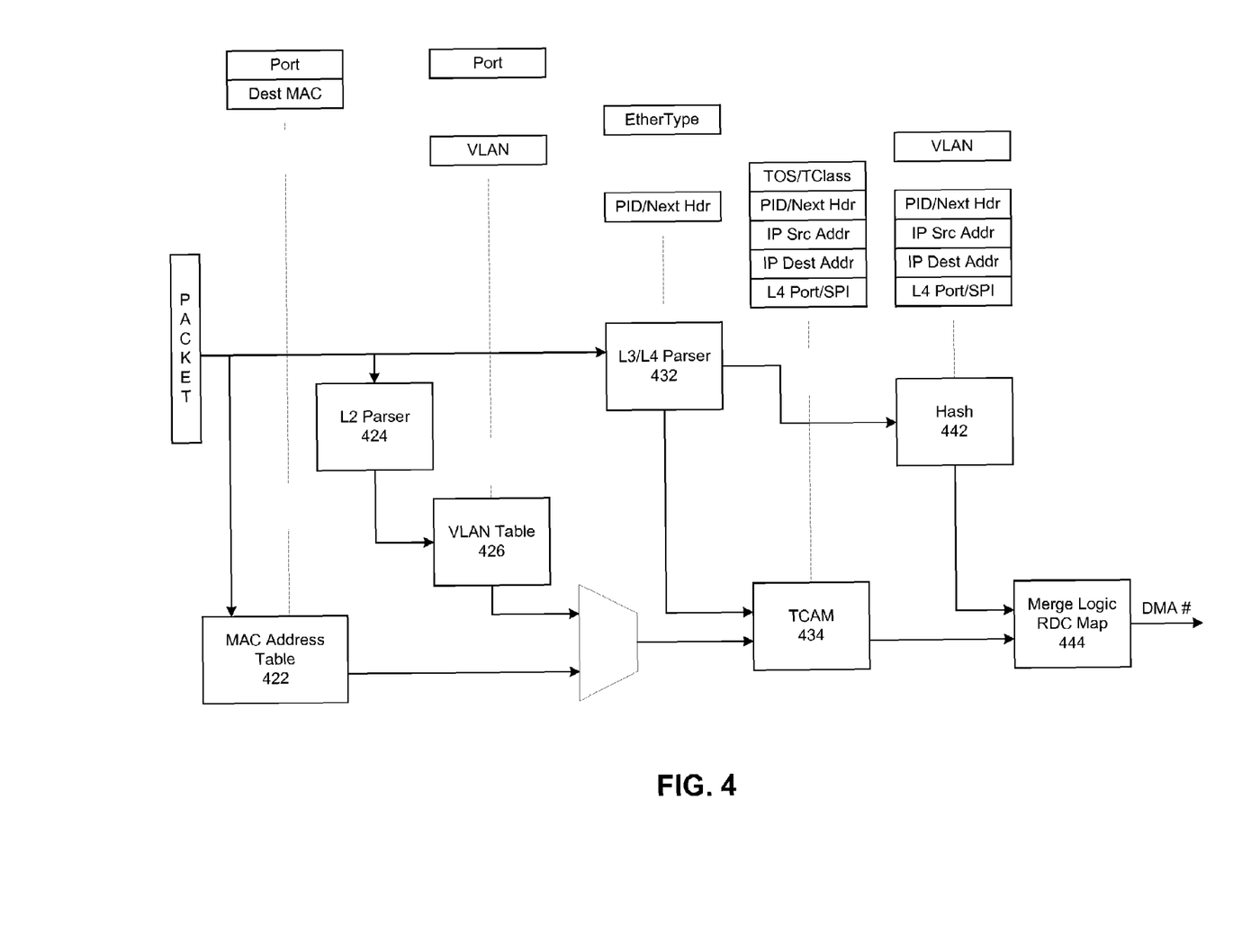
FIG. 4 is a block diagram illustrating a classification hierarchy employed in an embodiment of the invention.

FIG. 4 illustrates the classification hierarchy employed in an embodiment of the invention, and shows how a packet may be classified at various levels using different sets or subsets of packet attributes.

In this embodiment, a first iteration of classification is performed by using packet attributes up to layer 2 of the packet's protocol stack. In particular, MAC (Medium Access Control) address table 422 provides a first classification to select a DMA for processing the packet based simply on its physical port and destination MAC address.

In parallel, layer two (L2) parser 424 and VLAN table 426 cooperate to select a DMA for processing the packet based on its port and VLAN attribute. A precedence operator functions to choose one of the DMAs output by MAC address table 422 and VLAN table 426 as the elected L2 DMA. If, of course, the test specifies that the packet is not to be classified using both MAC address and VLAN, then the corresponding processing need not be performed.

In a second layer of classification that draws upon layer 3 and layer 4 packet attributes, L3/L4 parser 432 and TCAM 434 elect a layer 3/layer 4 DMA (or a set of multiple DMAs). The L3/L4 parser examines the packet's ether type (LEN/TYPE) field, and NEXT_HEADER for IPv6 packets or the Protocol ID field for IPv4 packets, and sends attributes of suitable packets (e.g., UDP, TCP) to the TCAM. The TCAM may examine such attributes as traffic classification, Next Header (for IPv6), Protocol ID (for IPv4), IP source address, IP destination address and L4 port in order to assist in its selection of the L3/L4 DMA. The TCAM also receives the L2 DMA from the layer 2 precedence operator and may keep that DMA or override it.

In a third layer of classification, hash generator 442 generates a hash using any or all of the indicated fields/attributes (and/or others), in order to try to spread or load-balance packets across the eligible DMA engines. The hash, along with the L3/L4 DMA, is used by merge logic/RDC (Receive DMA Channels) map 444. The merge logic elects the final DMA from among the various candidates (i.e., those nominated in L2, L3 and L4 processing).

In one embodiment, hash generator 442 employs a polynomial based on the identified packet attributes to produce a 32 bit value. A subset (e.g., the lower 5 bits) of this value may be output from the hash generator.

During validation of packet classification, as described above a packet configurator employs the operative DMA policy, which may be embodied in shadows of MAC address table 422, L2 parser 424, VLAN table 426, etc.), to select a set of packet attributes for testing a particular DMA. The packet configurator essentially applies the hierarchy of FIG. 4 in reverse, starting with a target DMA and possibly a target set or subset of packet attributes to be used to reach that DMA, and ending with a set of packet attribute values to be fed to a packet formatter and the device under test.

Although FIG. 4 only illustrates classification being performed through layer four of a packet's protocol stack, in other embodiments of the invention classification may proceed through all seven layers. In addition, other embodiments may classify based on the same fields/attributes employed in the illustrated embodiment, and/or others.

Further, although multiple iterations of classification are illustrated in FIG. 4, to focus on different protocol layers to produce intermediate DMA elections (i.e., L2 DMA, L3/L4 DMA), in an alternative embodiment the classification process may be collapsed to a single stage, regardless of how large a set of packet attributes are examined.

The program environment in which a present embodiment of the invention is executed illustratively incorporates a general-purpose computer or a special purpose device such as a hand-held computer. Details of such devices (e.g., processor, memory, data storage, display) may be omitted for the sake of clarity.

It should also be understood that the techniques of the present invention may be implemented using a variety of technologies. For example, the methods described herein may be implemented in software executing on a computer system, or implemented in hardware utilizing either a combination of microprocessors or other specially designed application specific integrated circuits, programmable logic devices, or various combinations thereof.

In particular, methods described herein may be implemented using data structures and program code residing on a suitable computer-readable medium, which may be any device or medium that can store data and/or code for use by a computer system. This includes, but is not limited to, volatile memory, non-volatile memory, magnetic and optical storage devices such as disk drives, magnetic tapes, CDs (compact discs), DVDs (digital versatile discs or digital video discs), or other media capable of storing computer-readable media now known or later developed.

The foregoing embodiments of the invention have been presented for purposes of illustration and description only. They are not intended to be exhaustive or to limit the invention to the forms disclosed. Accordingly, the scope of the invention is defined by the appended claims, not the preceding disclosure.

What is claimed is:

1. A validation framework for validating packet classification performed by an input/output device, the validation framework comprising:
   a packet configurator configured to generate test sets of attributes for packets designed to validate the component's packet classification;
   a packet formatter configured to format said packets based on the generated test sets of attributes, for input to the device;
   a policy configurator configured to dynamically replace a current operating policy of the device with a replacement policy without halting the packet classification validation; and
   a checker configured to examine the output of the device to determine if the device correctly classified the formatted packets.

2. The verification framework of claim 1, wherein said packet configurator receives an identity of a target DMA engine to test within the input/output device and a target set of packet attributes to use to test the target DMA engine.

3. The verification framework of claim 2, wherein said packet configurator identifies the target DMA (Direct Memory Access) engine to said checker for each test set of attributes.

4. The verification framework of claim 3, wherein said checker compares the target DMA engine to the DMA engine that issued the output from the input/output device.

5. The verification framework of claim 1, wherein said packet configurator comprises shadows for subsets of packet attributes to be used to test packet classification within the input/output device.

6. The verification framework of claim 1, wherein said policy configurator submits the replacement policy to the input/output device and said packet configurator.

7. The verification framework of claim 1, wherein the current operating policy and the replacement policy specify how to classify a packet.

8. The verification framework of claim 1, further comprising:
the input/output device.

9. The verification framework of claim 1, further comprising:
a testbench configured to identify a target DMA engine to test within the input/output device.

10. The verification framework of claim 1, wherein said packet configurator comprises one or more shadow storage elements, each said shadow corresponding to a set of packet attributes tested in the input/output device.

11. A computer-implemented method of validating classification of packets by an input/output device, in a computer system comprising a packet configurator, a packet formatter, a policy configurator and a checker, the method comprising:
installing an initial classification policy in the input/output device;
identifying a target DMA (Direct Memory Access) engine within the input/output device, and a target set of packet attributes for testing the target DMA engine;
generating test sets of values for the target packet attributes;
for each test set of values, formatting a packet with the test set of values;
inputting the packets to the input/output device; and
examining output of the input/output device to determine if the input/output device correctly classified the packets.

12. The method of claim 11, wherein a classification policy specifies which DMA engine to use for classification within the input/output device for a particular configuration of packet attribute values.

13. The method of claim 11, further comprising, without halting said validating:
selecting a replacement classification policy;
installing the replacement classification policy in the input/output device in place of the initial classification policy; and
continuing said generating, formatting, inputting and examining.

14. The method of claim 11, wherein said formatting a packet comprises assembling a packet with the test set of values to test classification within a receive path of the input/output device.

15. The method of claim 11, wherein said formatting a packet comprises assembling the test set of values to test classification within a transmit path of the input/output device.

16. The method of claim 11, wherein a formatted packet comprises:
a full packet configured to test a receive path of the input/output device; or
the corresponding test set of values, configured to test a transmit path of the input/output device.

17. The method of claim 11, wherein said installing an initial classification policy comprises:
shadowing initial parameters of the initial classification policy in a packet configurator configured to generate said test sets of values;
setting a callback to signal completion of programming of the input/output device with the initial classification policy;
programming the input/output device with the initial classification policy; and
signaling to the packet configurator success of the callback.

18. The method of claim 17, further comprising replacing the initial classification policy by:
identifying a replacement policy;
submitting one or more replacement parameters of the replacement policy to the packet configurator;
setting a callback to signal completion of programming of the input/output device with the replacement policy;
programming the input/output device with the replacement policy;
signaling success of the callback to the packet configurator; and
in the packet configurator, switching from said initial parameters to said replacement parameters for generating said test sets of values.

19. A non-transitory computer readable medium storing instructions that, when executed by a computer, cause the computer to perform a method of validating classification of packets by an input/output device, the method comprising:
installing an initial classification policy in the input/output device;
identifying a target DMA (Direct Memory Access) engine within the input/output device, and a target set of packet attributes for testing the target DMA engine;
generating test sets of values for the target packet attributes;
for each test set of values, formatting a packet with the test set of values;
inputting the packets to the input/output device; and
examining output of the input/output device to determine if the input/output device correctly classified the packets.

* * * * *